US011868926B2

(12) United States Patent
Shao et al.

(10) Patent No.: US 11,868,926 B2
(45) Date of Patent: Jan. 9, 2024

(54) SYSTEMS AND METHODS FOR MANAGING PUBLIC PLACE IN SMART CITY

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Haitang Xiang, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/660,416

(22) Filed: Apr. 24, 2022

(65) Prior Publication Data

US 2023/0306321 A1   Sep. 28, 2023

(30) Foreign Application Priority Data

Mar. 24, 2022   (CN) .......................... 202210292445.6

(51) Int. Cl.
*G06Q 10/00*   (2023.01)
*G06Q 10/063*   (2023.01)
(Continued)

(52) U.S. Cl.
CPC ........... *G06Q 10/063* (2013.01); *G06F 16/25* (2019.01); *G06N 3/04* (2013.01); *G06Q 50/26* (2013.01)

(58) Field of Classification Search
None
See application file for complete search history.

(56) References Cited

U.S. PATENT DOCUMENTS

| 6,421,066 B1 * | 7/2002 | Sivan .................... G06F 16/904 |
| | | 715/855 |
| 11,555,706 B1 * | 1/2023 | Levihn ..................... G06N 3/08 |

(Continued)

FOREIGN PATENT DOCUMENTS

| CN | 109948550 A |    | 6/2019 |
| CN | 110008413 A | *  | 7/2019 |

(Continued)

OTHER PUBLICATIONS

Fengjun Shang, Yi Jiang, Anping Xiong, Wen Su, and Li He (A Node Localization Algorithm Based on Multi-Granularity Regional Division and the Lagrange Multiplier Method in Wireless Sensor Networks, Sensors 2016, 16, 1934; doi:10.3390/s16111934)). (Year: 2016).*

(Continued)

*Primary Examiner* — Hafiz A Kassim
(74) *Attorney, Agent, or Firm* — METIS IP LLC

(57) ABSTRACT

The disclosure provides a method for managing a public place in a smart city. The method may comprise obtaining pedestrian distribution information in a preset area during a current time period. The method may comprise determining, based on the pedestrian distribution information, at least one area location in the preset area for a future time period, and a population flow load of the area location may be greater than a first threshold. The method may comprise determining, based on the area location, prompt information. The method may comprise sending the prompt information to a user platform through a service platform.

9 Claims, 6 Drawing Sheets

(51) Int. Cl.
    *G06N 3/04*           (2023.01)
    *G06F 16/25*         (2019.01)
    *G06Q 50/26*        (2012.01)

(56) References Cited

U.S. PATENT DOCUMENTS

| | | | | |
|---|---|---|---|---|
| 2004/0073356 | A1* | 4/2004 | Craine | G08G 1/096741 |
| | | | | 701/469 |
| 2008/0032703 | A1* | 2/2008 | Krumm | H04W 4/029 |
| | | | | 455/456.1 |
| 2011/0161119 | A1* | 6/2011 | Collins | G06Q 40/08 |
| | | | | 705/4 |
| 2012/0232795 | A1* | 9/2012 | Robertson | G01C 21/00 |
| | | | | 706/46 |
| 2015/0199573 | A1* | 7/2015 | Rane | G06F 16/583 |
| | | | | 382/168 |
| 2016/0371973 | A1* | 12/2016 | Holleczek | H04W 4/029 |
| 2018/0020324 | A1* | 1/2018 | Beauford | H04W 4/025 |
| 2019/0164418 | A1 | 5/2019 | Neukart et al. | |
| 2019/0390963 | A1* | 12/2019 | Kumar | G01C 21/3667 |
| 2020/0081445 | A1* | 3/2020 | Stetson | G05D 1/0246 |
| 2020/0242924 | A1* | 7/2020 | Publicover | G08G 1/087 |
| 2021/0209939 | A1 | 7/2021 | Wang et al. | |
| 2022/0207992 | A1* | 6/2022 | Fowe | G08G 1/012 |

FOREIGN PATENT DOCUMENTS

| | | | | |
|---|---|---|---|---|
| CN | 110458351 | A | | 11/2019 |
| CN | 111144648 | A | | 5/2020 |
| CN | 111178598 | A | | 5/2020 |
| CN | 111476691 | A | | 7/2020 |
| CN | 111612206 | A | | 9/2020 |
| CN | 111709778 | A | | 9/2020 |
| CN | 110704636 | B * | 1/2021 | G06F 16/288 |
| CN | 112257934 | A | 1/2021 | |
| CN | 112418567 | A | 2/2021 | |
| CN | 112508305 | A | 3/2021 | |
| CN | 112541440 | A * | 3/2021 | G06K 9/00778 |
| CN | 113159393 | A | 7/2021 | |
| CN | 113762578 | A | 12/2021 | |
| CN | 113869779 | A | 12/2021 | |
| CN | 114005085 | A | 2/2022 | |
| CN | 114092866 | A | 2/2022 | |
| CN | 109858670 | B * | 11/2022 | |
| KR | 101638368 | B1 | 7/2016 | |
| WO | 2021058099 | A1 | 4/2021 | |
| WO | WO-2022126669 | A1 * | 6/2022 | G06K 9/00778 |

OTHER PUBLICATIONS

First Office Action in Chinese Application No. 202210292445.6 dated Apr. 28, 2022, 19 pages.
White Paper on Urban Brain Development, Smart City Standard Working Group of National Beacon Commission, 2022, 59 pages.
Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
Chen, Shi, Flow Prediction based on Deep Neural Network, University of Science and Technology of China, 2020, 68 pages.
Pan, Zheyi et al., Urban Traffic Prediction from Spatio-Temporal Data Using Deep Meta Learning, 25th ACM SIGKDD International conference, 1720-1730, 2019.

* cited by examiner

SYSTEMS AND METHODS FOR MANAGING PUBLIC PLACE IN SMART CITY

CROSS-REFERENCE TO RELATED APPLICATIONS

This application claims priority of Chinese Patent Application No. 202210292445.6, filed on Mar. 24, 2022, the entire contents of which are incorporated herein by reference.

TECHNICAL FIELD

The present disclosure generally relates to the field of Internet of Things (IoT) and cloud platforms, and in particular, to systems and methods for managing public place in smart city.

BACKGROUND

With the development of information science technologies, the concept of the cloud platforms and the applications of the cloud platforms in IoT are mentioned by more and more people. A cloud platform service mode with cloud computing as a core service may solve the problem of insufficient information processing capabilities of various platforms of the IoT through scale gain and resource sharing. The introduction of the cloud platforms may provide efficient, dynamic, and massively scalable computing capabilities for the IoT, enabling a user-led IoT to run better and more efficiently. In the social life, public places are often crowded with people or have a large population flow. Users are required to queue or wait for a long time in such public places, while other public places are sparsely populated and the population flow is small. In this case, the population flow of the plurality of public places may not be balanced and the gathering of people may not be avoided.

Therefore, it is desirable to provide methods and systems for managing public place in smart city. The IoT and the cloud platforms may be used to manage a plurality of public places as a whole to avoid the gathering of people and reduce the time of queuing or waiting for users.

SUMMARY

One aspect of the embodiments of the present disclosure provides a method for measuring energy of natural gas components. The method may comprise obtaining pedestrian distribution information in a preset area during a current time period. The method may comprise determining, based on the pedestrian distribution information, at least one area location in the preset area for a future time period, and a population flow load of the area location may be greater than a first threshold. The method may comprise determining, based on the area location, prompt information. The method may comprise sending the prompt information to a user platform through a service platform.

In some embodiments, the obtaining pedestrian distribution information in a preset area during a current time period may include obtaining the pedestrian distribution information through a management platform database, the management platform database obtaining data through at least one management sub-platform database.

In some embodiments, the at least one management sub-platform database may correspond to at least one management sub-platform. The at least one management sub-platform may include at least one of a parking lot management platform, a park management platform, a subway management platform, a bus management platform, a museum management platform, a stadium management platform, or a shopping mall management platform. The at least one management sub-platform may obtain data through the corresponding at least one management sub-platform database.

In some embodiments, the at least one management sub-platform database may obtain data from an object platform through a sensor network platform database, and the object platform may include at least one of a ticket checking device, a camera monitoring device, or an unmanned aerial vehicle (UAV) device.

In some embodiments, a subway management platform database corresponding to the subway management platform may obtain data from the ticket checking device through the sensor network platform database.

In some embodiments, the determining, based on the pedestrian distribution information, at least one area location in the preset area for a future time period may include determining, by processing the pedestrian distribution information through an area location prediction model, the at least one area location. The area location prediction model may include a graph neural network model. A graph input into the graph neural network model may include at least two nodes and at least one edge, each of the at least two nodes may include at least one public place site, and the at least one edge may include a relationship between the at least two nodes. A node characteristic of the each node may include a count of entrances and exits of the at least one public place site, distribution positions of the entrances and the exits, time information, node environment information, holiday information, or a size of a parking lot. An edge characteristic of the at least one edge may include a relationship strength vector.

In some embodiments, the at least one edge of the graph input into the graph neural network model may be determined by a process. The process may include obtaining, based on a knowledge map, a distance between nodes of the knowledge map and a count of hops between the nodes of the knowledge map. The process may include determining whether the distance between the nodes of the knowledge map is less than a second threshold and whether the count of hops between the nodes of the knowledge map is less than a third threshold. In response to determining that the distance between the nodes of the knowledge map is less than the second threshold and the count of hops between the nodes of the knowledge map is less than the third threshold, the process may include determining, based on the nodes of the knowledge map, a connecting line between the nodes of the knowledge map as the edge of the graph input into the graph neural network model.

In some embodiments, the edge characteristic of the edge of the graph input into the graph neural network model may include a first transition probability characteristic.

In some embodiments, the knowledge map may include an edge with a reachable relationship, and the first transition probability characteristic may be determined through a second transition probability characteristic of an edge with a direct reachable relationship.

Another aspect of the embodiments of the present disclosure provides a system for managing a public place in a smart city. The system may comprise at least one storage device including a set of instructions, and at least one processor in communication with the at least one storage device, wherein when executing the set of instructions, the at least one processor is configured to cause the system to obtain pedestrian distribution information in a preset area during a current time period. The at least one processor is configured to cause the system to determine, based on the pedestrian distribution information, at least one area location in the preset area for a future time period, and a population flow load of the area location may be greater than a first threshold. The at least one processor is configured to cause the system to determine, based on the area location, prompt information. The at least one processor is configured to cause the system to send the prompt information to a user platform through a service platform.

A non-transitory computer readable medium storing instructions, when executed by at least one processor, causing the at least one processor to implement a method, and the method may comprise obtaining pedestrian distribution information in a preset area during a current time period. The method may comprise determining, based on the pedestrian distribution information, at least one area location in the preset area for a future time period, and a population flow load of the area location may be greater than a first threshold. The method may comprise determining, based on the area location, prompt information. The method may comprise sending the prompt information to a user platform through a service platform.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
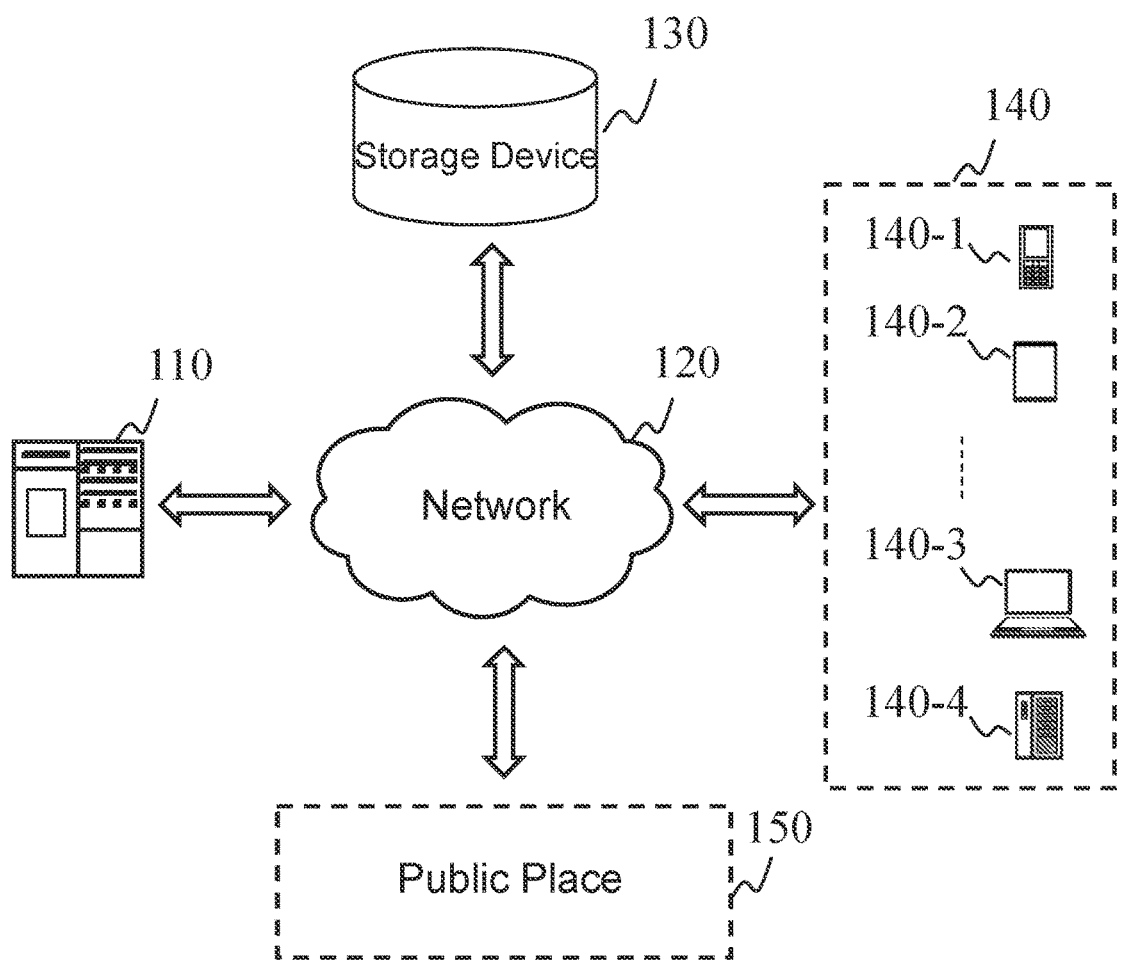
FIG. 1 is a schematic diagram illustrating an application scenario of an IoT system for managing a public place in a smart city according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an application scenario of an IoT system for managing a public place in a smart city according to some embodiments of the present disclosure.

In some embodiments, the application scenario 100 of an IoT system for managing a public place in a smart city may include a processing device 110, a network 120, a storage device 130, a terminal 140, and a public place 150. In some embodiments, components in the application scenario 100 may be connected with and/or in communication with each other via the network 120 (e.g., a wireless connection, a wired connection, or a combination thereof). For example, the processing device 100 may be connected to the storage device 130 via the network 120.

In some embodiments, the processing device 110 may process information and/or data related to the application scenario 100 of an IoT system for managing a public place in a smart city to perform one or more functions described in the present disclosure. For example, the processing device 110 may determine one or more area locations in a preset area for a future time period based on pedestrian distribution information. In some embodiments, the processing device 110 may include one or more processing engines (e.g., a single-chip processing engine or a multi-chip processing engine). Merely as an example, the processing device may include a Central Processing Unit (CPU). The processing device 110 may process data, information, and/or processing results obtained from other devices or components of the system, and execute program instructions based on the data, information, and/or processing results to perform one or more functions described in the present disclosure.

The network 120 may include any suitable network that may facilitate information and/or data exchange of the IoT system for managing a public place. The information and/or data may be exchanged between one or more components (e.g., the storage device 130, the processing device 110, the terminal 140) of the IoT system for managing a public place via the network 120. For example, the network 120 may send prompt information to a user platform via a service platform. In some embodiments, the network 120 may be any one or more of a wired network or a wireless network. In some embodiments, the network 120 may include one or more network access points. For example, the network 120 may include wired or wireless network access points. In some embodiments, the network 120 may be in various topologies such as point-to-point, shared, centralized, or the like, or a combination of a plurality of topologies.

The storage device 130 may be used to store data, instructions, and/or any other information. In some embodiments, the storage device 130 may store data and/or information obtained from the processing device 110, the terminal 140, or the like. For example, the storage device 130 may store videos of population flow, the pedestrian distribution information, or the like. In some embodiments, the storage device 130 may be arranged in the processing device 110. In some embodiments, the storage device 130 may include a mass storage, a removable storage, or the like, or any combination thereof.

The terminal 140 may be a device or other entity directly related to the management of a public place. In some embodiments, the terminal 140 may be a terminal used by a manager of a public place, such as a terminal used by a staff of the management of the public place. In some embodiments, the terminal 140 may include a mobile device 140-1, a tablet 140-2, a notepad 140-3, a laptop 140-4, or the like, or any combination thereof. In some embodiments, the mobile device 140-1 may include a smartphone, a smart paging device, or the like, or other smart devices. The mobile device 140-1 may interact with other components in the service platform via the network 120. For example, the mobile device 140-1 may receive the information sent by the service platform that the population flow in one or more areas is relatively large, and people may not go to the areas as much as possible. In some embodiments, the terminal 140 may include other smart terminals, such as a wearable smart terminal or the like. The terminal 140 may be a smart terminal, or may be an entity including a smart terminal, for example, a management device including a smart computer.

The public place 150 may refer to various places providing public services to users. For example, the public place may include a shopping mall, a parking lot, a subway, and/or a park, or the like. A certain relationship may exist among the various public places, for example, a distance relationship among the various public places, a relationship whether the various public places may be reachable (e.g., the shopping mall may be reached via the subway), or the like.

It should be noted that the above descriptions are merely provided for the purposes of illustration, and not intended to limit the scope of the present disclosure. For persons having ordinary skills in the art, multiple variations and modifications may be made under the teachings of the present disclosure. For example, the application scenario 100 of the IoT system for managing a public place may implement similar or different functions on other devices. However, those variations and modifications do not depart from the scope of the present disclosure.

The IoT system may be an information processing system including part or all of a user platform, a service platform, a management platform, a sensor network platform, and an object platform. The user platform may refer to a user-led platform that may obtain user requirements and feedback information to the users. The service platform may refer to a platform that may provide the users with input and output services. The management platform may realize an overall planning and coordination of the connection and cooperation among various functional platforms (such as the sensor network platform and the object platform), gather the information of an IoT system, and provide perception management and control management functions for the IoT system. The sensor network platform may realize the connection between the management platform and the object platform, and play a role of sensing communication of perception information and control information. The object platform may be a functional platform for the generation of the perception information and the execution of the control information.

The information processing in the IoT system may be divided into a processing of the perception information and a processing of the control information, and the control information may be generated based on the perception information. The processing of the perception information may be that the object platform obtains the perception information and transmits the perception information to the management platform through the sensor network platform. The control information may be sent by the management platform to the object platform through the sensor network platform to realize the control of a corresponding object.

In some embodiments, when the IoT system is applied to city management, the IoT system may be referred to as an IoT system of a smart city.

Figure 2:
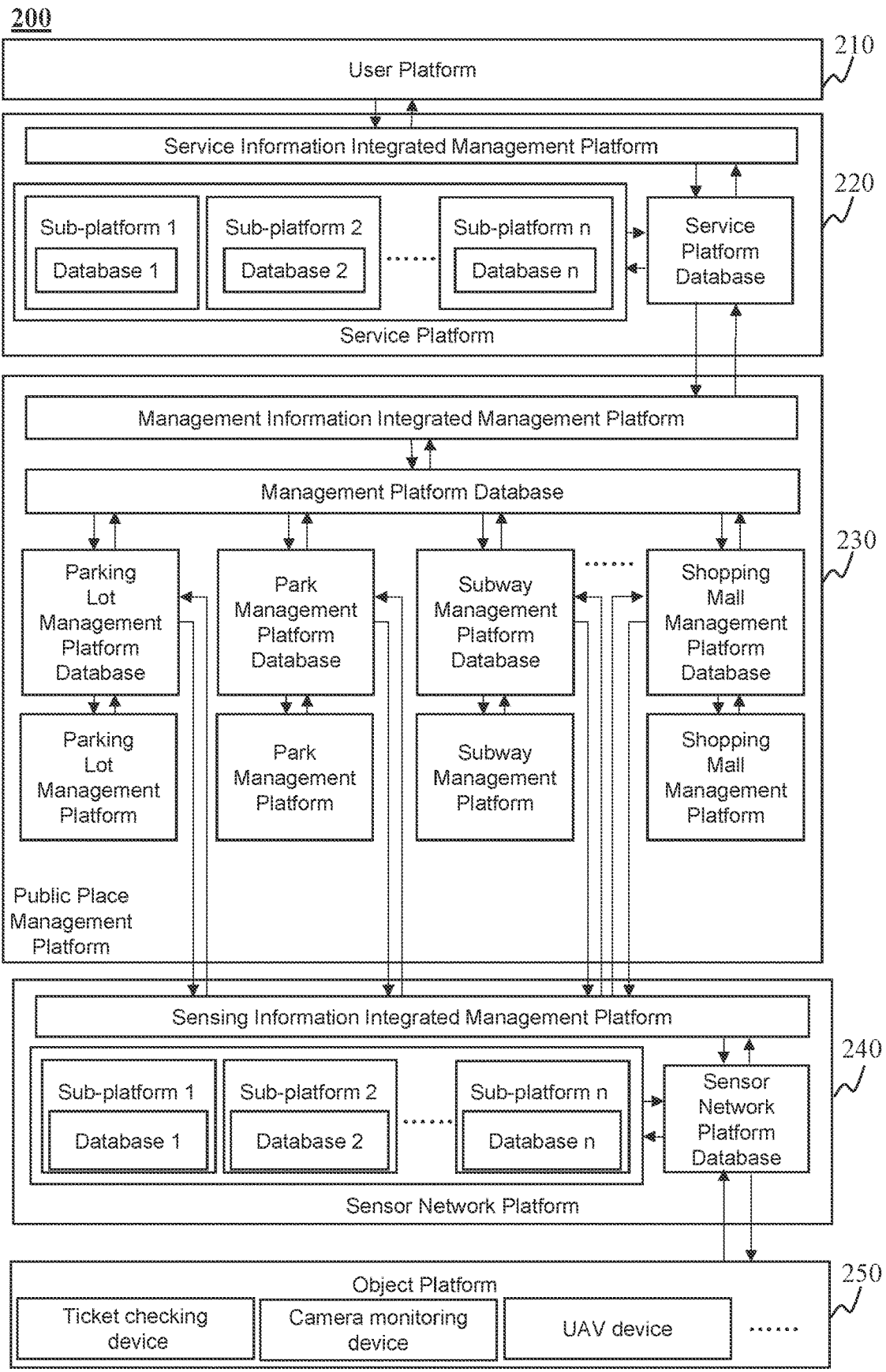
FIG. 2 is a schematic diagram illustrating an IoT system for managing a public place in a smart city according to some embodiments of the present disclosure.

FIG. 2 is a schematic diagram illustrating an IoT system for managing a public place in a smart city according to some embodiments of the present disclosure. As shown in FIG. 2, the IoT system 200 for managing a public place in a smart city may be implemented based on an IoT system. The IoT system 200 for managing a public place in a smart city may include a user platform 210, a service platform 220, a public place management platform 230, a sensor network platform 240, and an object platform 250. In some embodiments, the IoT system 200 for managing a public place in a smart city may be a part of the processing device 110 or implemented through the processing device 110.

The user platform 210 may refer to a user-led platform. For example, the user platform 210 may obtain an input instruction from the user through a terminal (e.g., the terminal 140), and inquire about the pedestrian distribution information. As another example, the user platform may feedback the pedestrian distribution information to the user.

The service platform 220 may refer to a platform providing input and output services to the user. For example, the service platform may send prompt information or the like to the user platform. In some embodiments, the service platform 220 may include a service information integrated management platform, a management platform database, a plurality of service sub-platforms, and a plurality of databases corresponding to the plurality of service sub-platforms, respectively. For example, the plurality of service sub-platforms may include a sub-platform 1, a sub-platform 2, . . . , a sub-platform n, or the like. The corresponding plurality of databases may be database 1, database 2, . . . , database n, or the like. The service platform 220 may realize the information interaction with the plurality of service sub-platforms, the user platform, and the public place management platform through the service platform database. The service platform 220 may obtain the relevant information of the user platform through the service information integrated management platform.

The public place management platform 230 may coordinate the connection and cooperation among various functional platforms, and gather all the information of the IoT system. The public place management platform 230 may be a platform providing perception management and control management functions for the IoT operating system. For example, the public place management platform 230 may obtain the pedestrian distribution information in a preset area for a future time period. At least one area location in the preset area for the future time period may be determined based on the pedestrian distribution information, and based on the area location, prompt information may be determined. The prompt information may be sent to the user platform through the service platform. The public place management platform 230 may include the processing device 110 shown in FIG. 1 as well as other components. In some embodiments, the public place management platform 230 may be a remote platform operated by a manager, artificial intelligence, or a pre-set rule. In some embodiments, the public place management platform 230 may include a management information integrated management platform. The public place management platform 230 may obtain the relevant information of the service platform database through the management information integrated management platform.

Figure 3:
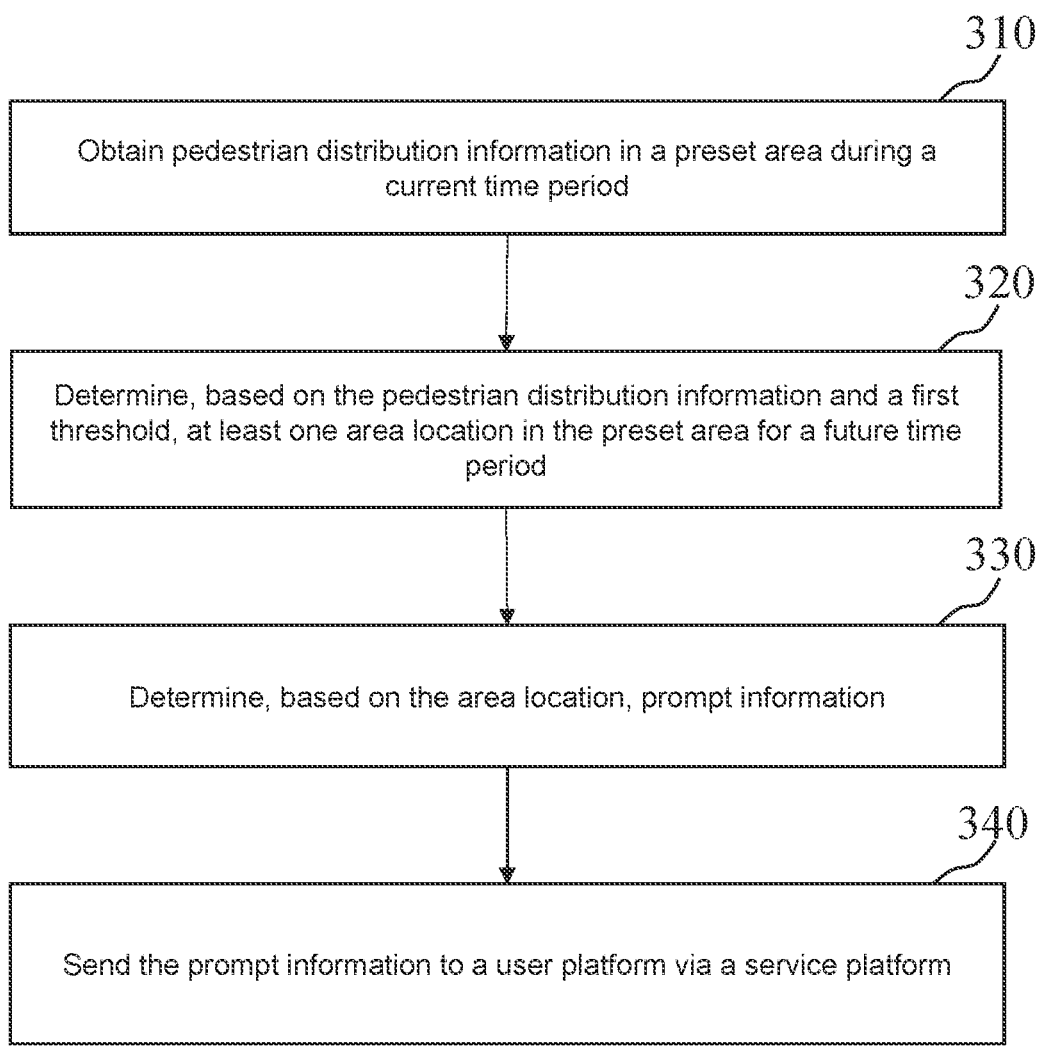
FIG. 3 is a schematic flowchart illustrating an IoT system for managing a public place in a smart city according to some embodiments of the present disclosure.
Figure 4:
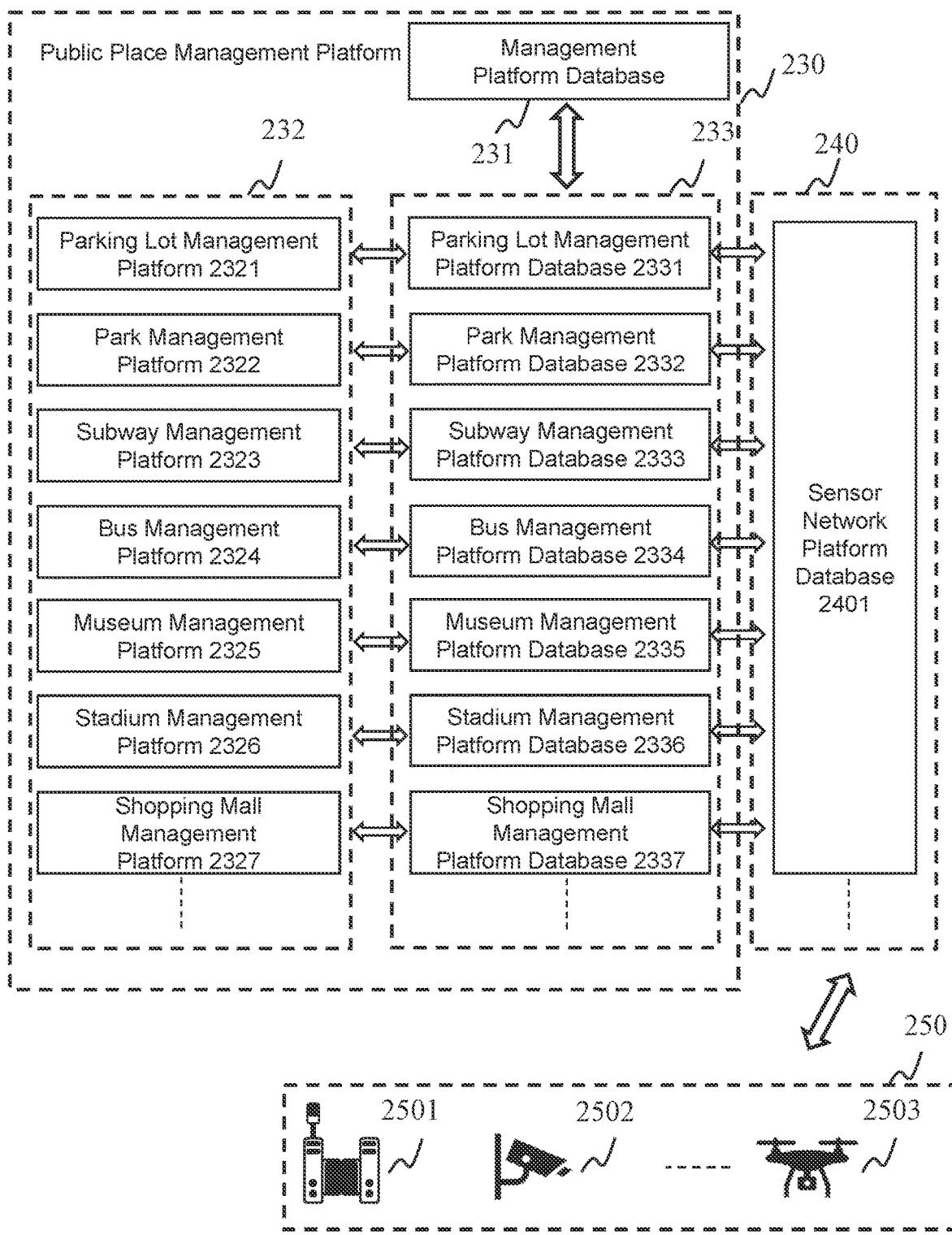
FIG. 4 is a schematic diagram illustrating a public place management platform, a sensor network platform, and an object platform according to some embodiments of the present disclosure.

In some embodiments, as shown in FIG. 4, the public place management platform 230 may include a management platform database 231, a management sub-platform 232, a management sub-platform database 233, or the like. For more details about the management platform database 231, the management sub-platform 232, and the management sub-platform database 233, refer to FIG. 3, FIG. 4, and related descriptions.

The sensor network platform 240 may refer to a functional platform managing the sensing communication. In some embodiments, the sensor network platform 240 may connect the public place management platform 230 and the object platform 250 to realize the functions of the sensing communication of the perception information and the control information. In some embodiments, the sensor network platform 250 may include a plurality of sensor network sub-platforms and a plurality of databases corresponding to the plurality of sensor network sub-platforms, respectively. For example, the plurality of sensor network sub-platforms may include a sub-platform 1, a sub-platform 2, . . . , a sub-platform n, or the like. The corresponding plurality of databases may be database 1, database 2, . . . , database n, or the like. In some embodiments, the sensor network platform 240 may include a sensing information integrated management platform. The sensor network platform 240 may realize the information interaction with the public place management platform through the sensing information integrated management platform.

The object platform 250 may refer to a functional platform generating the perception information. In some embodiments, the object platform 250 may obtain information, for example, population flow information may be obtained from different preset areas, or the like.

More details about the sensor network platform 240 and the object platform 250 may refer to FIG. 3, FIG. 4, and the related descriptions.

In some embodiments, the IoT system 200 for managing a public place of a smart city may be applied to various scenarios of the public place management. In some embodiments, the IoT system 200 for managing a public place in a smart city may separately acquire relevant data of the public place in various scenarios to obtain public place management policies in each scenario, for example, data about a population flow, an opening hour, an open area, a ticket price, maintenance information, or the like. In some embodiments, the IoT system 200 for managing a public place in a smart city may obtain a public place management policy for an entire area (e.g., the entire city) based on various related data of the public place in various scenarios.

The various scenarios of public place management may include, for example, a parking lot scenario, a park scenario, a subway scenario, or the like. For example, the various scenarios of public place management may include a parking lot public place management, a park public place management, a subway public place management, or the like. It should be noted that the above scenarios are merely provided for the purposes of illustration, and not intended to limit the specific application scenarios of the IoT system 200 for managing a public place in a smart city. For persons having ordinary skills in the art, the IoT system 200 for managing a public place in a smart city may be applied to any other suitable scenarios on based on the descriptions of the present disclosure.

In some embodiments, the IoT system 200 for managing a public place in a smart city may be applied to the parking lot public place management. When applied to the parking lot public place management, the object platform 250 may be used to collect data related to the parking lot, such as data related to traffic flow at different times, an opening hour, a ticket price, whether maintenance is required, or the like. The object platform 250 may upload the collected data related to the parking lot to the sensor network platform 240 (e.g., the sensor network platform database). The sensor network platform 240 may aggregate the collected data. For example, the sensor network platform 240 may divide the collected data based on the traffic flow at different times, an area, or the like. The sensor network platform 240 may upload the aggregated and processed data to the parking lot management platform database through the sensor network platform database. The public place management platform may obtain relevant data through the parking lot management platform database. Policies or instructions related to the operation and management of the parking lot may be determined based on the processing of the collected data, such as instructions for the count of remaining vacancies in the parking lot, closing instructions, or the like.

In some embodiments, the IoT system 200 for managing a public place in a smart city may be applied to the park public place management. When applied to the park public place management, the object platform 250 may be used to collect related data of the park. For example, the related data of the park may be population flow at different times, an opening hour, a ticket price, maintenance information, or the like. The object platform may upload the collected data of the park to the sensor network platform database. The sensor network platform 240 may aggregate the collected data. For example, the sensor network platform 240 may divide the collected data based on the population flow at different times, an area, or the like. The sensor network platform 240 may upload the aggregated and processed data to the park management platform database through the sensor network platform database. The public place management platform may obtain relevant data through the park management platform database. Policies or instructions related to the operation and management of the park may be determined based on the processing of the collected data, such as an instruction that the park has a large population flow load during a certain period of time, an instruction that the park is open from 09:00 to 18:00, an instruction that recreational facilities of the park need maintenance, or the like.

In some embodiments, the IoT system 200 for managing a public place in a smart city may be applied to the subway public place management. When applied to the subway public place management, the object platform 250 may be used to collect related data of the subway. For example, the related data of the subway may be population flow at different times, an opening hour, a ticket price, maintenance information, or the like. The object platform may upload the collected data of the subway to the sensor network platform database. The sensor network platform 240 may aggregate the collected data. For example, the sensor network platform 240 may divide the collected data based on the population flow at different times, the ticket price at different stations, whether the subway needs maintenance, or the like. The sensor network platform 240 may upload the aggregated and processed data to the subway management platform database through the sensor network platform database. The public place management platform may obtain relevant data through the subway management platform database. Policies or instructions related to the operation and management of the subway may be determined based on the processing of the collected data, such as an instruction for population flow of the current time period, an instruction that the subway is open from 06:00 to 22:00, an instruction that facilities of the subway need maintenance, or the like.

In some embodiments, the IoT system 200 for managing a public place in a smart city may be composed of a plurality of subsystems for managing a public place in a smart city, each of which may be applied to a scenario. The IoT system 200 for managing a public place in a smart city may comprehensively manage and process the data acquired and output by each subsystem, thereby obtaining relevant policies or instructions for assisting the management of the public place in the smart city.

For example, the IoT system 200 for managing a public place in a smart city may include a subsystem applied to the parking lot public place management, a subsystem applied to the park public place management, and a subsystem applied to the subway public place management. the IoT system 200 for managing a public place in a smart city may serve as an upper-level system of each subsystem.

The following may illustrate the IoT system 200 for managing a public place in a smart city managing each subsystem and obtaining policies for managing a public place in a smart city based on corresponding data obtained from the subsystems:

The IoT system 200 for managing a public place in a smart city may obtain relevant data about the traffic flow at different times, the opening hour, the ticket price, whether maintenance is required, or the like, based on the subsystem of the parking lot public place management. The IoT system 200 for managing a public place in a smart city may obtain relevant data about the population flow at different times, the opening hour, the ticket price, or the like, based on the subsystem of the park public place management. The IoT system 200 for managing a public place in a smart city may obtain relevant data about the population flow at different times, the opening hour, the ticket price, whether maintenance is required, or the like, based on the subsystem of the subway public place management.

When the IoT system 200 for managing a public place in a smart city obtains the data mentioned above, a plurality of object platforms may be separately set corresponding to each subsystem to obtain data.

After the IoT system 200 for managing a public place in a smart city obtains the data mentioned above, the sensor network platform 240 may aggregate the collected data. The sensor network platform 240 may upload the aggregated and processed data to the management sub-platform database through the sensor network platform database. The public place management platform 230 may obtain data through the management sub-platform database. Predicted data related to the public place management may be determined by the public place management platform 230 based on the processing of the collected data.

For example, the sensor network platform 240 may determine a prediction of the population flow from the parking lot to a nearby park based on an instruction of vacancies remaining in the parking lot, a closing instruction, or the like. The sensor network platform 240 may determine a prediction of the population flow from the subway to the nearby park based on an instruction of the population flow data of the subway in the current time period. The sensor network platform 240 may determine the population flow in different areas of the park in a future time period based on the population flow of the park in the current time period. The sensor network platform 240 may upload the data mentioned above to the public place management platform through the sensor network platform database. The public place management platform may predict the population flow from the parking lot to the nearby park, the population flow from the subway to the nearby park, and the population flow in different areas of the park in the future time period based on the data mentioned above. The public place management platform may further determine an area location of the park with a larger population flow load in the future time period.

As another example, the sensor network platform 240 may determine the prediction of the population flow from the subway to the nearby park based on the population flow data of the subway in the current time period, or the like. The sensor network platform 240 may determine the population flow of the park at different time periods and the maintenance requirements of the recreational facilities in the park based on the relevant data of the park, such as the opening hour, the maintenance information, or the like. The sensor network platform 240 may upload the data mentioned above to the public place management platform through the sensor network platform database. The public place management platform may predict the population flow from the subway to the nearby park, the population flow of the park at different time periods, the opening hour of the park, and the maintenance information of the recreational facilities in the park based on the data mentioned above. The public place management platform may further determine the maintenance time of the recreational facilities in the park.

For persons having ordinary skills in the art, after understanding the principles of the IoT system 200 for managing a public place in a smart city, the IoT system 200 for managing a public place in a smart city may be implemented in any other suitable scenarios without departing from the principles of the IoT system 200.

The following may take the IoT system 200 for managing a public place in a smart city applied to the population flow management of the public place as an example to illustrate the IoT system 200 for managing a public place in a smart city in detail.

The public place management platform 230 may be configured to obtain pedestrian distribution information in a preset area during a current time period, and determine, based on the pedestrian distribution information, at least one area location in the preset area for a future time period, wherein a population flow load of the area location is greater than a first threshold. The public place management platform 230 may also be configured to determine, based on the area location, prompt information, and send the prompt information to a user platform through a service platform.

In some embodiments, the public place management platform 230 may also be configured to obtain the pedestrian distribution information through a management platform database. The management platform database may obtain data through at least one management sub-platform database.

In some embodiments, the at least one management sub-platform database may correspond to at least one management sub-platform. The at least one management sub-platform may include at least one of a parking lot management platform, a park management platform, a subway management platform, a bus management platform, a museum management platform, a stadium management platform, or a shopping mall management platform. The at least one management sub-platform may obtain data through the corresponding at least one management sub-platform database.

In some embodiments, the at least one management sub-platform database may obtain data from an object platform through a sensor network platform database, and the object platform may include at least one of a ticket checking device, a camera monitoring device, and an unmanned aerial vehicle (UAV) device.

In some embodiments, a subway management platform database corresponding to the subway management platform may obtain data from a ticket checking gate through the sensor network platform database.

For more descriptions about the management sub-platform, the sensor network platform, and the object platform, refer to FIG. 4 and the related descriptions, which is not repeated herein.

In some embodiments, the public place management platform 230 may be configured to determine the at least one area location based on a processing of the pedestrian distribution information through an area location prediction model. The area location prediction model may include a graph neural network model. A composition of a graph input into the graph neural network model may include at least two nodes and at least one edge. Each of the at least two nodes may include at least one public place site, and the at least one edge may include a relationship between the at least two nodes. A node characteristic of the node may include a count of entrances and exits of the at least one public place site, distribution positions of the entrances and the exits, time information, node environment information, holiday information, and a parking lot size. An edge characteristic of the at least one edge may include a relationship strength vector. For more details about the area location prediction model and the graph neural network model, refer to FIG. 5 and the related descriptions, which is not repeated herein.

In some embodiments, the public place management platform 230 may be configured to obtain, based on a knowledge map, a distance between nodes of the knowledge map and a count of hops between the nodes of the knowledge map, and determine whether the distance between the nodes of the knowledge map is less than a second threshold and whether the count of hops between the nodes of the knowledge map is less than a third threshold. The public place management platform 230 may also be configured to determine, based on the nodes of the knowledge map, a connecting line between the nodes of the knowledge map as the edge of the graph input into the graph neural network model in response to that the distance between the nodes of the knowledge map is less than the second threshold and the count of hops between the nodes of the knowledge map is less than the third threshold.

In some embodiments, the edge characteristic of the edge of the graph input into the graph neural network model may include a first transition probability characteristic. In some embodiments, the knowledge map may include an edge with a reachable relationship, and the first transition probability characteristic may be determined through a second transition probability characteristic of an edge with a direct reachable relationship. For more details about the determination of an edge of a graph input to the graph neural network model, refer to FIG. 6 and the related descriptions, which is not repeated herein.

It should be noted that the description of the system and the components of the system may be only for convenience of description, which does not limit the present disclosure within the scope of the embodiments. It may be understood that for those skilled in the art, after understanding the principles of the system, various modules may be combined with each other arbitrarily, or form a subsystem to connect with other modules without departing from the principles. In some embodiments, the sensor network platform and the public place management platform may be integrated in one component. For example, each module may share a storage module, and each module may also have its own storage module. Such deformations may be all within the scope of the present disclosure.

FIG. 3 is a schematic flowchart illustrating an IoT system for managing a public place in a smart city according to some embodiments of the present disclosure. As shown in FIG. 3, a process 300 may include the following operations. In some embodiments, the process 300 may be performed by the public place management platform 230.

In operation 310, the public place management platform 230 may obtain pedestrian distribution information in a preset area during a current time period.

The preset area may refer to a preset area that needs to monitor the pedestrian distribution information and has a certain range. For example, the preset area may include one or more public places such as a parking lot area, a park area, a subway area, a bus area, a museum area, a stadium area, a shopping mall area, or the like.

The current time period may refer to a time period to which a current moment belongs. For example, if the current moment is 11:00, the current time period may be 10:40 to 11:00, 10:50 to 11:10, or the like.

The pedestrian distribution information may refer to different distribution information of users in a plurality of areas. For example, the pedestrian information may include different counts of users corresponding to the plurality of areas, or the like. Merely as an example, the count of users corresponding to a park area 1 may be 500, the count of users corresponding to a museum area 2 may be 1000, or the like.

In some embodiments, the related data of the pedestrian distribution information may be represented in a form of a two-tuples. For example, the form of the two-tuples may be (A, A1), wherein A may represent the area, and A1 may represent the count of users corresponding to the area A. In the example mentioned above, the count of users corresponding to the park area 1 is 500, and the corresponding two-tuples is (1, 500). The count of users corresponding to the museum area 2 is 1000, and the corresponding two-tuples is (2, 1000).

In some embodiments, the pedestrian distribution information may be represented by a plurality of population flow loads corresponding to a plurality of areas in a preset area. Different preset areas may correspond to different population flow loads. A plurality of preset areas may correspond to the plurality of population flow loads. The pedestrian distribution information in the preset area may be determined through the plurality of population flow loads. For the relevant descriptions about the population flow load, refer to the relevant descriptions in operation 320, which is not repeated herein.

In some embodiments, the public place management platform may obtain the pedestrian distribution information in the preset area during the current time period from one or more components in the application scenario 100 or an external device. For example, the public place management platform may obtain the population flow load of the plurality of public places from the management platform database. The pedestrian distribution information may be obtained by calculating (e.g., manual calculation, etc.) the population flow load of the plurality of public places.

In some embodiments, the public place management platform may obtain the pedestrian distribution information through the management platform database. In some embodiments, the public place management platform may obtain data of the management platform database through one or more management sub-platform databases.

In some embodiments, the public place management platform 230 may include a corresponding management platform database 231 shown in FIG. 4. The management platform database 231 may store the data of the public place management platform and obtain the data of the management sub-platform database. For example, the management platform database 231 may store the data of the public place management platform (e.g., the pedestrian distribution information, etc.). The management platform database 231 may obtain the data of the management sub-platform database 233.

In some embodiments, the management sub-platform 232 may include a corresponding management sub-platform database 233. As shown in FIG. 4, the management sub-platform database 233 may include a parking lot management platform database 2331, a park management platform database 2332, a subway management platform database 2333, a bus management platform database 2334, a museum management platform database 2335, a stadium management platform database 2336, a shopping mall management platform database 2337, or the like. For more details about the management sub-platform 232 and the management sub-platform database 233, refer to FIG. 4 and the related descriptions, which is not repeated herein.

In some embodiments, the public place management platform 230 may obtain the pedestrian distribution information through the management platform database 231. For example, the public place management platform may obtain a plurality of data of the current time period in the management platform database. The public place management platform may analyze and process the plurality of data to obtain the pedestrian distribution information of one or more public places.

In some embodiments, the management platform database may obtain data through one or more management sub-platform databases. For example, the management platform database may obtain data of the parking lot management platform database, the park management platform database, the subway management platform database, the shopping mall management platform database, or the like, respectively. In some embodiments, the management platform database may periodically obtain data from the plurality of management sub-platform databases based on a certain preset rule. For example, the preset rule may be an interval for storing data, and the interval may be 10 minutes, 30 minutes, or the like. The management platform database may obtain data from the plurality of management sub-platform databases every 30 minutes.

In some embodiments, the pedestrian distribution information may be obtained through the management platform database. The management platform database may obtain data through the one or more management sub-platform databases, and obtain data from the management sub-platform databases corresponding to the plurality of public places. The comprehensiveness of the pedestrian distribution information may be ensured, which provides a guarantee for the determination of the population flow load of different areas in the future time period.

In operation 320, the public place management platform may determine at least one area location in a preset area for a future time period based on the pedestrian distribution information.

The future time period may refer to a period of time after a current moment. For example, if the current moment is 11:00, the future time period may be 11:00 to 12:00, 11:30-11:12:30, or the like.

The area location may refer to a location where the population flow load corresponding to part or all of the preset area is greater than a first threshold. The area location may be a location corresponding to one or more areas in the preset area or a location corresponding to one or more partial areas in a certain area. For example, the area location may be a location corresponding to a museum area, a location corresponding to a basketball court in a stadium area, a location corresponding to a soccer field, or the like. The population flow loads of the corresponding positions mentioned above may all be greater than the first threshold.

In some embodiments, the population flow load of the area location may be greater than the first threshold. The population flow load may refer to a carrying capacity of users at one or more areas in a certain period of time. For example, in the future time period of 11:00 to 12:00, the population flow load of the location corresponding to the museum area may be 1000. The first threshold may refer to a preset value of the population flow load of the area corresponding to the area location. The first thresholds corresponding to different area locations may be the same or different. In some embodiments, the first threshold may be set based on experience or actual needs. For example, the first threshold may be set according to an area size corresponding to the area location.

For example, a region area corresponding to the area location 1 may be 5000 square meters, and the first threshold may be 700. A region area corresponding to the area location 2 may be 10,000 square meters, and the first threshold may be 1,400. For another example, the first threshold may be set according to an area property corresponding to the area location. For example, the first thresholds corresponding to different area locations with the same region area may be different. The first threshold corresponding to the location of the museum may be 300, and the first threshold corresponding to the location of the basketball court in the stadium may be 800.

In some embodiments, the public place management platform may determine one or more area locations in a preset area for a future time period based on the pedestrian distribution information. For example, the public place management platform 230 may predict the population flow load at different locations of one or more preset areas in the future time period based on the pedestrian distribution information during the current time period. The public place management platform 230 may determine the area location according to the population flow loads corresponding to different locations of different preset areas. For example, when the population flow loads corresponding to three locations in the preset area are greater than the corresponding first thresholds, respectively, the public place management platform 230 may determine the three locations in the preset area as the area locations.

In operation 330, the public place management platform may determine prompt information based on the area location.

The prompt information may refer to information prompting the user about the one or more area locations. In some embodiments, the prompt information may be a preset template. For example, a template 1 may be "Hello everyone, the population flow of an area location is large at the moment, please do not go there." A template 2 may be "the population flow of an area location is relatively large, please try to choose other places." A template 3 may be "please protect your personal belongings," or the like.

In some embodiments, the public place management platform may determine the prompt information based on the area location. For example, the area location may be a location corresponding to the basketball court in the stadium, and the prompt information determined by the public place management platform may be "Hello everyone, the population flow of the basketball court in the stadium is large now, please do not go there."

In operation 340, the public place management platform may send the prompt information to the user platform through the service platform.

In some embodiments, the public place management platform may send the prompt information to the user platform through the service platform. For example, the public place management platform may send the prompt information of "Hello everyone, the population flow of the basketball court in the stadium is large now, please do not go there" to the user platform through the service platform.

In some embodiments, the area location with a larger population flow in the future time period may be determined based on the pedestrian distribution information in the preset area during the current time period, and the prompt information may be sent to the user. The user may choose which areas to go to according to the prompt information. The user may not go to areas with large population flow. Gathering of people may be avoided, which reduces the time for users to queue or wait, and saves time for users.

FIG. 4 is a schematic diagram illustrating a public place management platform, a sensor network platform, and an object platform according to some embodiments of the present disclosure.

In some embodiments, the at least one management sub-platform database may correspond to at least one management sub-platform. The at least one management sub-platform may include at least one of a parking lot management platform 2321, a park management platform 2322, a subway management platform 2323, a bus management platform 2324, a museum management platform 2325, a stadium management platform 2326, or a shopping mall management platform 2327.

The management sub-platform 232 may refer to a platform for managing a certain public place. Different management sub-platforms may manage different public places. For example, the parking lot management platform 2321 may manage parking lots of a public place, and the museum management platform 2325 may manage a museum of a public place.

In some embodiments, the at least one management sub-platform 232 may obtain data through the corresponding at least one management sub-platform database 233. For example, the parking lot management platform 2321 may obtain the population flow load during the current time period from the parking lot management platform database 2331. As another example, the subway management platform 2323 may obtain the population flow load during the current time period from the subway management platform database 2333.

In some embodiments, the plurality of management sub-platform databases 233 may obtain data from the object platform 250 through the sensor network platform database.

The sensor network platform 240 may include a sensor network platform database 2401, and the sensor network platform may realize data interaction with the public place management platform and the object platform through the sensor network platform database 2401. The sensor network platform 240 may include a plurality of sensor network sub-platforms, such as a parking lot sensor network platform, a park sensor network platform, a subway sensor network platform, a bus sensor network platform, a museum sensor network platform, a stadium sensor network platform, a shopping mall sensor network platform, or the like. The sensor network sub-platform may extract data from the sensor network platform database 2401, perform calculation processing on the corresponding data, and give feedback of the processing results to the sensor network platform database 2401.

In some embodiments, the object platform 250 may include a plurality of devices, for example, at least one of a ticket checking device 2501, a camera monitoring device 2502, an unmanned aerial vehicle (UAV) device 2503, or the like. The ticket checking device 2501 may refer to a device for checking and identifying relevant information. The count of users passing through a preset area may be determined through the ticket checking device 2501. A plurality of camera monitoring devices 2502 and UVA devices 2503 may monitor and take pictures of a plurality of preset areas. The population flow information of the plurality of preset areas may be calculated based on the video captured by the camera monitoring device and the UAV device. In some embodiments, the UVA device 2503 may carry an infrared sensor. The public place management platform may obtain a heat map of the pedestrian distribution information of the plurality of preset areas based on the infrared sensor.

In some embodiments, the different management sub-platform databases 233 may obtain data from the object platform 250 (e.g., the ticket checking device 2501, etc.) through the sensor network platform database. For example, the management sub-platform database 233 may obtain the count of users passing through a certain preset area from a counter of the ticket checking device 2501 through the sensor network platform database. As another example, the management sub-platform database 233 may obtain data from the camera monitoring device 2502 through the sensor network platform database. For example, the camera monitoring device 2502 may shoot a plurality of videos, and the management sub-platform database 233 may obtain the plurality of videos through the sensor network platform database.

In some embodiments, the sensor network sub-platform may process the plurality of videos based on a recognition model, and obtain the population flow information of the plurality of preset areas in the videos. The recognition model may refer to a model that recognizes a user in a video. In some embodiments, a type of the recognition model may include a Yolo model or the like. In some embodiments, the input of the recognition model may include each frame of the video, or the like. The output of the recognition model may include an image segmentation result. The image segmentation result may include a plurality of object boxes and categories corresponding to the object boxes. For example, one object box may correspond to one user, and the plurality of object boxes may correspond to the plurality of users. A video may correspond to the plurality of object boxes, and the plurality of object boxes of the video may be designated as a group of object boxes.

In some embodiments, the recognition model may be obtained by training based on a plurality of training samples and labels.

In some embodiments, the training samples may include sample videos. A label may be a sample object from a user and a category corresponding to the object box. Training data (e.g., training samples) may be obtained based on historical surveillance videos, and the labels of the training data may be determined by manual labeling or automatic labeling. The training samples with labels may be input into an initial recognition model. Parameters of the initial recognition model may be updated through training. When the trained initial recognition model satisfies a preset condition, the training may end, and the trained recognition model may be obtained.

In some embodiments, images of different boxes may include the same user. The categories corresponding to the plurality of object boxes output by the recognition model may correspond to the same user. The sensor network sub-platform may determine whether the same user exists in the plurality of object boxes of a group of object boxes based on an object determination model. When the same user exists in the plurality of object boxes, the same object boxes may be merged. When the same object boxes in a group of object boxes are merged, the count of object boxes in an existing group of object boxes may be determined as the count of users in the video.

In some embodiments, types of the object determination model may include a CNN model, a DNN model, or the like. The sensor network sub-platform may input an object box into the CNN model for image feature extraction, and obtain an image feature corresponding to the object box. A plurality of image features corresponding to a group of object boxes may be obtained by inputting the group of object boxes into the CNN model for image feature extraction.

In some embodiments, the input of the CNN model may include the plurality of object boxes. The output of the CNN model may include image features corresponding to different object boxes, and different image features may be represented by a feature vector. The sensor network sub-platform may input two image features into the DNN model to determine whether the two image features correspond to the same user. In some embodiments, the input of the DNN model may include two image features. The output of the DNN model may include a result of whether the two image features correspond to the same user. For example, the output result of "Yes" may indicate the image features correspond to the same user, and the output result of "No" may indicate the image features do not correspond to the same user.

In some embodiments, the CNN model and the DNN model may be obtained through joint training based on the plurality of training samples and labels.

In some embodiments, the training samples may include a sample group of object boxes. A label may be whether the sample object box corresponds to the same user. The training data may be obtained based on historical data, and the labels of the training data may be determined by manual labeling or automatic labeling. For example, a sample label that corresponds to the same user may be marked as 1 in a sample object box, and a sample label that does not correspond to the same user may be marked as 0 in a sample object box. The training samples with labels may be input into an initial CNN model and an initial DNN model. Parameters of the initial CNN model and the initial DNN model may be updated by training. When the trained initial CNN model and the initial DNN model satisfy a preset condition, the training may end, and the trained CNN model and DNN model may be obtained.

In some embodiments, the sensor network sub-platform may calculate the plurality of object boxes in the group of object boxes based on a feature extraction algorithm and a feature similarity algorithm, and determine whether the same user exists in object boxes. For example, the sensor network sub-platform may perform feature extraction on two of the plurality of object boxes of the group of object boxes through the feature extraction algorithm (e.g., the HOG algorithm), and obtain a feature vector of each object box. The sensor network sub-platform may determine whether each object box corresponds to the same user based on the similarity (e.g., a Euclidean distance, etc.) between the feature vector of each object box. When there is the same user, the same object boxes may be merged, and after merging, the count of object boxes in the group of object boxes may be determined as the count of users in the video. In some embodiments, the sensor network sub-platform may also determine whether the same user exists in the object boxes in other ways, which is not limited in the present disclosure.

In some embodiments, data of the plurality of management sub-platform databases may be obtained from the plurality of object platforms through the sensor network platform database, which ensures the diversity and accuracy of the data of the management sub-platform database, thereby ensuring the accuracy of the obtained population flow information. In some embodiments, the object boxes of the same user may be merged by determining the count of users in the video based on the recognition model and the object determination model. Thus, the accuracy of the count of users can be further ensured, thereby ensuring the accuracy of the data of the management sub-platform database.

In some embodiments, the subway management platform database corresponding to the subway management platform may obtain data from the ticket checking gate through the sensor network platform database.

In some embodiments, the sensor network platform database 2401 may be connected to the subway management platform database 2333 and the ticket checking gate to realize the functions of sensing communication of perception information and control information.

The ticket checking gate may refer to a device for checking and identifying information of users taking the subway. The population flow information of a plurality of subway entrances and exits may be determined based on a plurality of ticket checking gates.

In some embodiments, the subway management platform database 2333 may obtain data from the ticket checking gate through the sensor network platform database 2401. For example, the subway management platform database 2333 may obtain the population flow information of the plurality of subway entrances and exits from the counter of the ticket checking gate through the sensor network platform database 2401.

In some embodiments, the subway management platform database may obtain data from the ticket checking gate through the sensor network platform database, which ensures the accuracy of the data in the database of the subway management platform, thereby ensuring the accuracy of the population flow information of the subway in a public place.

Figure 5:
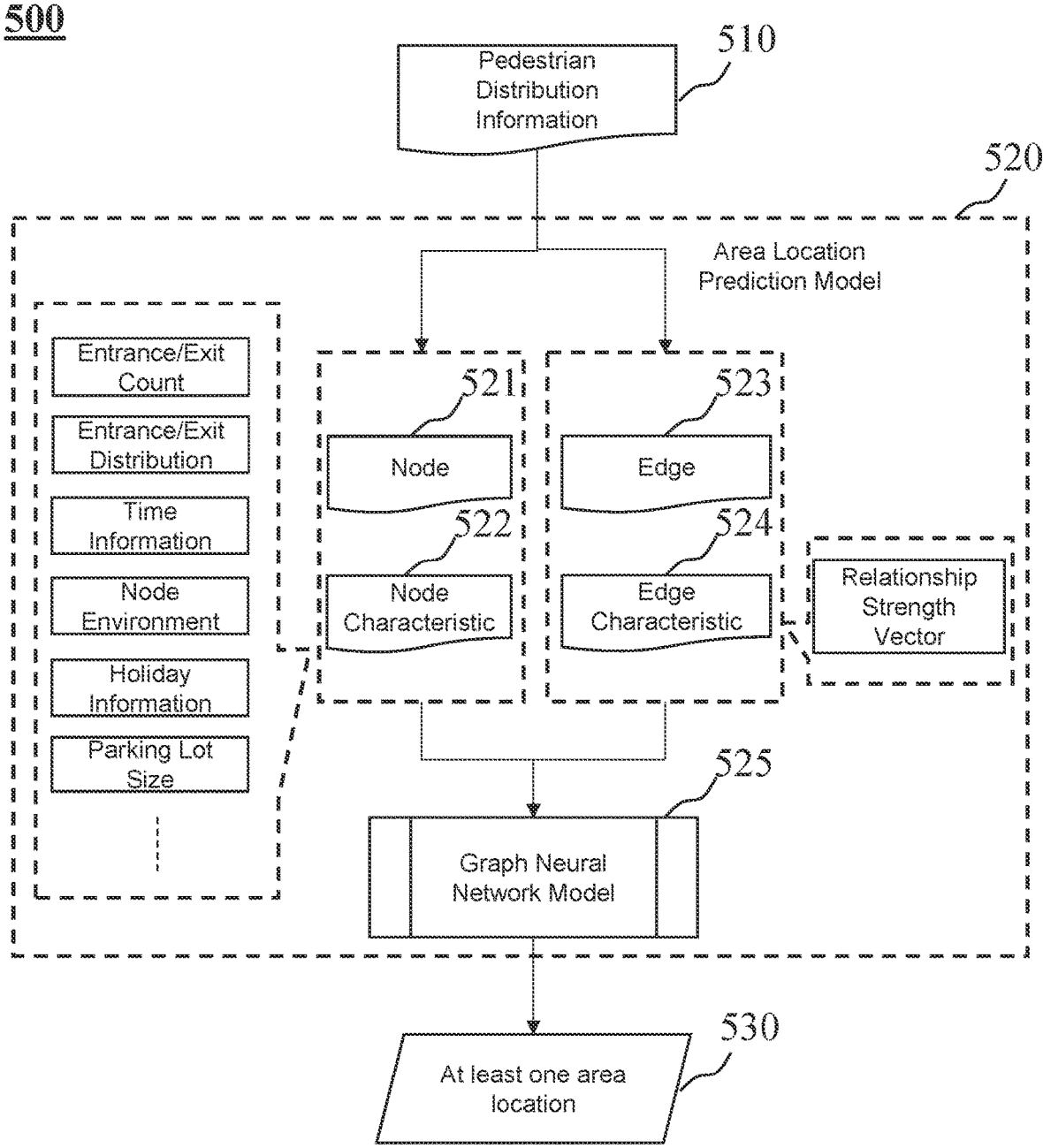
FIG. 5 is a schematic diagram illustrating a determination of an area location based on pedestrian distribution information according to some embodiments of the present disclosure.

FIG. 5 is a schematic diagram illustrating a determination of an area location based on pedestrian distribution information according to some embodiments of the present disclosure. In some embodiments, a process 500 may be performed by the public place management platform 230.

In some embodiments, the public place management platform may determine at least one area location based on a processing of the pedestrian distribution information through an area location prediction model.

The area location prediction model 520 may refer to a model for determining an area location.

Merely as an example, the pedestrian distribution information 510 may be input into the area location prediction model 520, and the area location prediction model 520 may output one or more area locations 530. In some embodiments, a plurality of areas in the preset area and a plurality of population flow loads corresponding to the plurality of areas, respectively, may be input into the area location prediction model. The area location prediction model may output one or more area locations 530.

In some embodiments, the public place management platform 230 may obtain the area location prediction model from one or more components in the application scenario 100 (e.g., the storage device 130, the terminal 140) or an external device via the network (e.g., the network 120). For example, the area location prediction model may be trained by a computing device (e.g., the processing device 110) and stored in a storage device (e.g., the storage device 130) in the application scenario 100. The processing device 110 may access the storage device and retrieve the area location prediction model.

In some embodiments, the public place management platform may train the area location prediction model based on at least one training sample and a label. In some embodiments, the area location prediction model may be trained by the public place management platform according to a machine learning algorithm, and the public place management platform may obtain at least one training sample. Each training sample may include sample pedestrian distribution information. A label may be a sample area location. In some embodiments, the sample area location may be marked manually or by the public place management platform. The training data may be obtained based on historical data, and the label of the training data may be determined by manual labeling or automatic labeling. For example, the sample area location may be determined by the actual population flow load of the preset area in the sample pedestrian distribution information. The public place management platform may designate a corresponding area location that the actual population flow load of the preset area in the sample pedestrian distribution information is greater than a first threshold as the sample area location.

In some embodiments, the area location prediction model 520 may include a graph neural network (GNN) model 525 or the like.

The GNN model may refer to a model used to determine the area location.

The input of the GNN model may be a graph. The graph may include nodes 521 and edges 523. The output of the GNN model may be determined based on the correlation of each node in the graph composed of nodes and edges. The output of the GNN model may be an area location 530 that the population flow load is greater than the first threshold.

In some embodiments, the public place management platform may train the GNN model based on at least one training sample and a label. In some embodiments, the GNN model may be trained by the public place management platform based on a machine learning algorithm. The public place management platform may obtain at least one training sample. Each training sample may include sample pedestrian distribution information. A label may be a sample area location. In some embodiments, the sample area location may be marked manually or by the public place management platform. The training data may be obtained based on the historical data of a plurality of management sub-platforms, and the label of the training data may be determined by manual labeling. For example, a maximum threshold of the population flow load of the plurality of public places may be determined, and the locations of one or more public places determined by manual labeling may be determined as the sample area location.

In the GNN model, each public place site may be designated as the node 521 of the graph input into the model, and the relationship between each public place site may be designated as the edge of the graph input into the model.

A public place site may refer to a place that may provide services to users, for example, a parking lot, a park, a subway station, a bus stop, a shopping mall, or the like.

In some embodiments, a node characteristic 522 input into the GNN model may be an information characteristic corresponding to at least one public place. In some embodiments, the node characteristic 522 may include a characteristic of at least one public place site such as the count of entrances and exits, distribution locations of the entrances and the exits, time information, node environment information, holiday information, a parking lot size, or the like.

In some embodiments, a surrounding traffic site of each public place site may also be designated as a node of the graph input into the GNN model, and the node characteristic may also include surrounding traffic flow. The surrounding traffic flow may refer to traffic information such as the count of people entering or exiting in a time period of a surrounding traffic node, the count of users at the current moment, or the like. For example, a subway station a and a bus station b may be the surrounding traffic nodes of the "shopping mall A". The surrounding traffic flow of the node characteristic of the shopping mall A may include the count of people entering or exiting in a time period of the subway station a and the bus station b, the count of users at the current moment, or other flow information.

In some embodiments, the public place management platform may obtain a plurality of related traffic nodes corresponding to one or more public place sites in a knowledge map. The surrounding traffic flow of a public place site may be determined by the flow information of the relevant traffic node. For example, the node may be the public site of the shopping mall A, and the relationship with the shopping mall A in the knowledge map may be that "shopping mall A arrives at Metro Line 1" or "shopping mall A arrives at Metro Line 3". The public place management platform may designate Metro Line 1 and Metro Line 3 as the surrounding traffic nodes of the shopping mall A. The public place management platform may determine the flow information of Metro Line 1 and Metro Line 3 as the surrounding traffic flow of the shopping mall A.

In some embodiments, an edge characteristic 524 of the edge input into the GNN model may be a relationship between two connected nodes, for example, a relationship between two public place sites. The edge characteristic of the edge input into the GNN model may include a relationship strength vector. The relationship strength vector may reflect the relationship strength between two nodes.

In some embodiments, the public place management platform may determine the relationship strength vector from a plurality of vectors. For example, the public place management platform may determine the relationship strength vector by weighting or splicing the plurality of vectors.

In some embodiments, the plurality of vectors may include distance strength vectors, location strength vectors, and category strength vectors. In some embodiments, the distance strength vector may represent a distance between two nodes connected by an edge. The public place management platform may determine the distance strength vector by the distance between two public places corresponding to two nodes connected by a certain edge. The smaller the distance between two public places, the greater the corresponding distance strength vector.

In some embodiments, the location strength vector may represent whether an arrival route between two nodes connected by a certain edge is convenient. The public place management platform may determine the location strength vector based on whether the arrival route between two public places corresponding to two nodes connected by a certain edge is convenient. For example, if node B is easy to reach from node A without avoiding obstacles, the location strength vector of the edge characteristic corresponding to the edge from node A to node B may be relatively large. As another example, if node D is not easy to reach from node C since several obstacles need to be avoided, the location strength vector of the edge characteristic corresponding to the edge from node C to node D may be relatively small.

In some embodiments, the category strength vector may represent the similarity between two nodes connected by an edge. The public place management platform may determine the category strength vector through the categories of the two public places corresponding to the two nodes connected by a certain edge. For example, if node E and node F are both shopping malls, the category strength vector of the edge characteristic of the edge corresponding to node E and node F may be relatively large, which may be an upper limit value (e.g., 1). As another example, if the categories of node G and node H are completely irrelevant (e.g., a park and a museum), the category strength vector of the edge characteristic of the edge corresponding to node G and node H may be small, which may be a lower limit value (e.g., 0). The illustrations mentioned above are only for the convenience of description, and the related distance strength vector, location strength vector, and category strength vector may be vectors with more than one dimension. For example, the location strength vector may be a three-dimensional vector, which represents "is it easy to reach by walking", "is it easy to reach by car", or "is it easy to reach by subway".

In some embodiments, the public place management platform may process the pedestrian distribution information based on the area location prediction model to determine one or more area locations. For example, the public place management platform may input the pedestrian distribution information 510 into the area location prediction model. The area location prediction model may output the one or more area locations with a population flow load greater than the first threshold. As another example, the processing device may input the node characteristic and edge characteristic into the GNN model, and the GNN model may output the one or more area locations with the population flow load greater than the first threshold.

In some embodiments, the one or more area locations may be determined by processing the pedestrian distribution information through the area location prediction model, which improves the accuracy of determining the area location with greater population flow load in the future time period.

Figure 6:
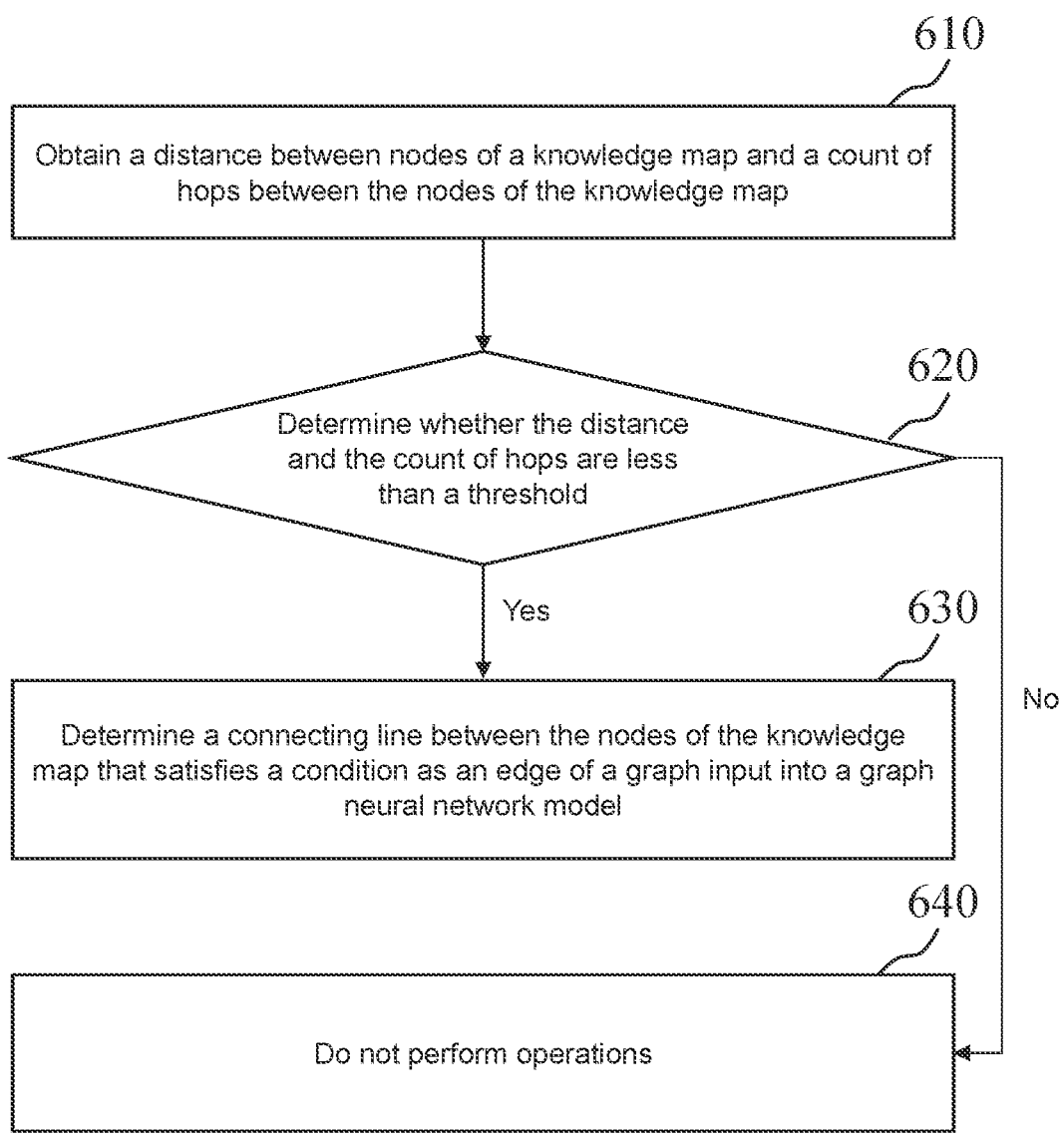
FIG. 6 is a schematic flowchart illustrating a determination of an edge of a graph input into a graph neural network model according to some embodiments of the present disclosure.

FIG. 6 is a schematic flowchart illustrating a determination of an edge of a graph input into a graph neural network model according to some embodiments of the present disclosure. In some embodiments, a process 600 may be performed by the public place management platform 230.

In operation 610, the public place management platform may obtain a distance between nodes of the knowledge map and a count of hops between the nodes of the knowledge map based on the knowledge map.

The knowledge map may reflect the areas, locations, and relationships of a plurality of public places. In some embodiments, the knowledge map may include nodes and relationships. The relationship of the knowledge map may refer to the relationship between nodes. The nodes may include the plurality of public places, transportation nodes, or the like. The plurality of public places may include shopping mall A, a park, a playground, or the like. The traffic nodes may include a subway station, a bus station, entrances and exits of a certain road, or the like. For example, station A of subway line 1, bus station B, the exit or entrance of road C, or the like. In some embodiments, attributes of the nodes may be represented by the population flow. Different nodes in the knowledge map may correspond to different population flows.

In some embodiments, a relationship between nodes may include a reachable relationship, or the like. The reachable relationship may refer to that one node may be reached from another node. The reachable relationship may include a direct reachable relationship, a non-direct reachable relationship, or the like. For example, the nodes are shopping mall A and subway line 1 in a public place, and the relationship between the shopping mall A and the subway line 1 may be "subway line 1 is reachable from shopping mall A". Therefore, the relationship between the shopping mall A and the subway line 1 may be the direct reachable relationship. As another example, the nodes are shopping mall C and shopping mall D in a public place, and the relationship between the shopping mall C and the shopping mall D may be "subway line 1 is reachable from shopping mall C" and "shopping mall D is reachable from subway line 1". Therefore, the relationship between the shopping mall C and the shopping mall D may be the non-direct reachable relationship.

In some embodiments, the relationship between nodes may include a distance between nodes, a transition probability between nodes, or the like. The distance between nodes may reflect whether a location of one node is far from a location of another node or not. For example, the distance between the nodes may be 500 meters, 1 kilometer, 3 kilometers, or the like.

The transition probability between nodes may reflect the probability of a user from one node to another node. For example, in the knowledge map, the shopping mall A may have two reachable relationships. Relationship 1 may be "station A of subway line 1 is reachable from shopping mall A". Relationship 2 may be "station F of subway line 3 is reachable from shopping mall A". The transition probabilities of the relationship 1 and the relationship 2 may be 40% and 60%, respectively, which indicates that the probability of the user of the shopping mall A going to the station A of subway line 1 may be 40% and the probability of the user of the shopping mall A going to the station F of subway line 3 may be 60%. In some embodiments, the transition probability between the nodes may be determined based on the manual setting.

In some embodiments, the count of hops between nodes may reflect the relationship between two nodes. The relationship between the two nodes may be the direct reachable relationship, the non-direct reachable relationship, or the like. For example, "node-edge-node" may be specified as one hop, wherein the edge may represent the relationship between the nodes. For example, the relationship between the shopping mall A and the shopping mall B in a public place may be direct reachable relationship (e.g., "shopping mall B is reachable from shopping mall A"), that is, one hop from the shopping mall A to the shopping mall B. As another example, the relationship between the shopping mall C and the shopping mall D in a public place may not be direct reachable relationship, and the relationship between the shopping mall C and the shopping D may be "subway line 1 is reachable from shopping mall C" and "shopping mall D is reachable from subway line 1", that is, two hops from the shopping mall C to the shopping mall D.

In some embodiments, the public place management platform may obtain a distance between nodes of the knowledge map and a count of hops between the nodes of the knowledge map based on the knowledge map. For example, the public place management platform may obtain the distance between nodes of the knowledge map and the count of hops between nodes of the knowledge map from one or more components in the application scenario 100 or an external device.

In operation 620, the public place management platform may determine whether the distance between the nodes of the knowledge map is less than a second threshold and whether the count of hops between the nodes of the knowledge map is less than a third threshold.

The second threshold may refer to a preset value of the distance between nodes. For example, the second threshold may be a maximum value of the distance between nodes (e.g., 2 kilometers). When the distance between two nodes is less than 2 kilometers, a connecting line between the corresponding two nodes may be the edge of the graph input into the graph neural network model.

The third threshold may refer to a preset value of the count of hops between nodes. For example, the third threshold may be a maximum count of hops between nodes (e.g., two hops). When the count of hops between two nodes is less than two hops, a connecting line between the corresponding two nodes may be the edge of the graph input into the graph neural network model.

In some embodiments, the public place management platform may determine the category of nodes by comparing the distance between every two nodes in the knowledge map with the second threshold. The public place management platform may determine a plurality of node groups. Each of the plurality of node groups may include two nodes. The plurality of node groups that the distance between the two nodes is less than the second threshold may be designated as category 1. The public place management platform may determine the category of nodes by comparing the count of hops between every two nodes in the knowledge map with the third threshold. The public place management platform may determine a plurality of node groups. Each of the plurality of node groups may include two nodes and the count of hops between the two nodes in the node group may be less than the third threshold. The plurality of node groups that the count of hops between the two nodes is less than the third threshold may be designated as category 2.

In operation 630, in response to that the distance between the nodes of the knowledge map is less than the second threshold and the count of hops between the nodes of the knowledge map is less than the third threshold, the public place management platform may determine a connecting line between the nodes of the knowledge map as the edge of the graph input into the graph neural network model based on the nodes of the knowledge map.

In some embodiments, the public place management platform may determine the nodes that the distance between the nodes of the knowledge map is less than the second threshold, and the nodes that the count of hops between the nodes of the knowledge map is less than the third threshold. The public place management platform may determine the connecting line between the nodes mentioned above as the edge of the graph input into the graph neural network model. For example, as described in the embodiments mentioned above, the public place management platform may determine the connecting lines between the two nodes in each of the plurality of node groups that exist in the category 1 and the category 2 simultaneously as the edges of the graph input into the graph neural network model.

In operation 640, when the distance between the nodes of the knowledge map and the count of hops between the nodes of the knowledge map may not be smaller than the threshold simultaneously, the public place management platform may not perform operations.

In some embodiments, the connecting line between nodes that satisfies the second threshold and the third threshold may be determined as the edges of the graph input into the graph neural network model based on the distance between the nodes of the knowledge map and the count of hops between the nodes of the knowledge map, which ensures the accuracy of the edge of the graph input into the graph neural network model, thereby ensuring the accuracy of determining the area location.

In some embodiments, the edge characteristic of the edge of the graph input into the GNN model may include a first transition probability characteristic.

The first transition probability characteristic may reflect a possibility that a node of an edge is reachable from the other node of the edge. For example, park 1 may have two reachable relationships. Relationship 3 may be "station G of subway line 1 is reachable from park 1". Relationship 4 may be "station H of subway line 3 is reachable from park 1". The first transition probabilities of the relationship 3 and the relationship 4 may be 40% and 60%, respectively, which indicates that the probability of a user of the park 1 going to station G of subway line 1 may be 40% and the probability of a user of the park 1 going to station H of subway line 3 may be 60%.

In some embodiments, the first transition probability characteristic may be determined through a second transition probability characteristic of an edge with a direct reachable relationship.

The second transition probability characteristic may reflect a possibility that a node corresponding to an edge in the knowledge map is reachable from another node.

In some embodiments, the public place management platform may determine the first transition probability through the second transition probability of the edge that the relationship in the knowledge may be reachable. For example, the relationship in the knowledge map and the corresponding second transition probability may be "subway line 1 is reachable from museum A, and the corresponding second transition probability is 40%." Shopping mall B is reachable from subway line 1, and the corresponding second transition probability is 40%. The edge of the graph input into the graph neural network model may be "shopping mall B is reachable from museum A." The museum A may only reach the shopping mall B through the subway line 1. The first transition probability corresponding to the edge of the graph in the graph neural network model may be 16% (40%×40%=16%), wherein the edge may represent "shopping mall B is reachable from museum A".

In some embodiments, the first transition probability characteristic of the edge of the graph input into the graph neural network model may be determined through the second transition probability characteristic of the edge with the direct reachable relationship in the knowledge map, which ensures the accuracy of the first transition probability characteristic, thereby further ensuring the accuracy of determining the area location.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for managing a public place in a smart city, which is executed by a processor of at least one public place management platform, comprising:
obtaining pedestrian distribution information in a preset area during a current time period via network from a storage device, including:
a processor of a sensor network sub-platform processing a plurality of videos based on a recognition model;
obtaining population flow information of a plurality of preset areas in the plurality of videos,
wherein the recognition model includes a Yolo model that recognizes users in the plurality of videos and the recognition model is obtained through a training process, comprising:
generating a plurality of first training samples and first labels; wherein the plurality of first training samples include sample videos obtained based on historical surveillance videos, the first labels include a sample object from the users and a category corresponding to an object box;
inputting the plurality of first training samples with labels into an initial recognition model;
updating parameters of the initial recognition model through training; and
obtaining the recognition model when the initial recognition model satisfies a preset condition;
obtaining pedestrian distribution information in the preset area during a current time period based on the population flow information; and
receiving the pedestrian distribution information transmitted from the sensor network sub-platform;
generating, based on the pedestrian distribution information, at least one area location in the preset area for a future time period, a population flow load of the area location being greater than a first threshold, wherein the at least one area location is determined by processing the pedestrian distribution information through an area location prediction model, the area location prediction model includes a graph neural network model, and the area location prediction model is trained by the public place management platform according to a machine learning algorithm based on at least one second training sample and at least one second label, wherein each second training sample includes sample pedestrian distribution information, and each second label is a sample area location that is determined by an actual population flow load of the preset area in the sample pedestrian distribution information, wherein generating the sample area location includes:
designating, by the processor of the public place management platform, a corresponding area location that the actual population flow load of the preset area in the sample pedestrian distribution information is greater than the first threshold as the sample area location;
a graph input into the graph neural network model includes at least two nodes and at least one edge, each of the at least two nodes includes at least one public place site, and the at least one edge includes a relationship between the at least two nodes;
a node characteristic of each node includes a count of entrances and exits of the at least one public place site, distribution positions of the entrances and the exits, time information, node environment information, holiday information, or a size of a parking lot;
an edge characteristic of the at least one edge includes a relationship strength vector, wherein the relationship strength vector reflects a relationship strength between two nodes, and the relationship strength vector is determined from a plurality of vectors, wherein the plurality of vectors include distance strength vectors, location strength vectors, and category strength vectors;
the node characteristic includes surrounding traffic flow;
an output of the graph neural network model is the area location, and the area location is determined based on a correlation of each node in the graph composed of nodes and edges;
generating, based on the area location, prompt information; and
feedbacking, the prompt information to a user terminal of a user platform through a service platform via network.

2. The method of claim 1, wherein the obtaining pedestrian distribution information in a preset area during a current time period includes:
obtaining the pedestrian distribution information through a management platform database, the management platform database obtaining data through at least one management sub-platform database.

3. The method of claim 2, wherein the at least one management sub-platform database corresponds to at least one management sub-platform, and the at least one management sub-platform includes:
at least one of a parking lot management platforms, a park management platform, a subway management platform, a bus management platform, a museum management platform, a stadium management platform, or a shopping mall management platform; and
the at least one management sub-platform obtains data through the corresponding at least one management sub-platform database.

4. The method of claim 3, wherein the at least one management sub-platform database obtains data from an object platform through a sensor network platform database, and the object platform includes at least one of a ticket checking device, a camera monitoring device, or an unmanned aerial vehicle (UAV) device.

5. The method of claim 4, wherein a subway management platform database corresponding to the subway management platform obtains data from the ticket checking device through the sensor network platform database.

6. The method of claim 1, wherein the at least one edge of the graph input into the graph neural network model is determined by a process including:
obtaining, based on a knowledge map, a distance between nodes of the knowledge map and a count of hops between the nodes of the knowledge map;
determining whether the distance between the nodes of the knowledge map is less than a second threshold and whether the count of hops between the nodes of the knowledge map is less than a third threshold;
in response to determining that the distance between the nodes of the knowledge map is less than the second threshold and the count of hops between the nodes of the knowledge map is less than the third threshold, determining, based on the nodes of the knowledge map, a connecting line between the nodes of the knowledge map as the edge of the graph input into the graph neural network model.

7. The method of claim 6, wherein the edge characteristic of the edge of the graph input into the graph neural network model includes a first transition probability characteristic, the knowledge map includes an edge with a reachable relationship, and the first transition probability characteristic is determined by a second transition probability characteristic of an edge with a direct reachable relationship.

8. An Internet of Things system for managing a public place in a smart city, comprising a user platform, a service platform, a public place management platform, a sensor network platform, and an object platform, the management platform of the public place includes a management sub-platform, a management sub-platform database, wherein the public place management platform is configured to perform the following operations including:
   obtaining pedestrian distribution information in a preset area during a current time period via network from a storage device, including:
   a processor of a sensor network sub-platform of the sensor network platform processing a plurality of videos based on a recognition model;
   obtaining population flow information of a plurality of preset areas in the plurality of videos,
   wherein the recognition model includes a Yolo model that recognizes users in the plurality of videos and the recognition model is obtained through a training process, comprising:
      generating a plurality of first training samples and first labels; wherein the plurality of first training samples include sample videos obtained based on historical surveillance videos, the first labels include a sample object from the users and a category corresponding to an object box;
      inputting the plurality of first training samples with labels into an initial recognition model;
      updating parameters of the initial recognition model through training; and
      obtaining the recognition model when the initial recognition model satisfies a preset condition;
   obtaining pedestrian distribution information in the preset area during a current time period based on the population flow information; and
   receiving the pedestrian distribution information transmitted from the sensor network sub-platform;
   determining, based on the pedestrian distribution information, at least one area location in the preset area for a future time period, a population flow load of the area location being greater than a first threshold, wherein the at least one area location is determined by processing the pedestrian distribution information through an area location prediction model, the area location prediction model includes a graph neural network model, and the area location prediction model is trained by the public place management platform according to a machine learning algorithm based on at least one second training sample and at least one second label, wherein each second training sample includes sample pedestrian distribution information, and each second label is a sample area location that is determined by an actual population flow load of the preset area in the sample pedestrian distribution information, and generating the sample area location including: the processing device of public place management platform designating an area location that the actual population flow load of the preset area in the sample pedestrian distribution information is greater than the first threshold as the sample area location;
   a graph input into the graph neural network model includes at least two nodes and at least one edge, each of the at least two nodes includes at least one public place site, and the at least one edge includes a relationship between the at least two nodes;
   a node characteristic of each node includes a count of entrances and exits of the at least one public place site, distribution positions of the entrances and the exits, time information, node environment information, holiday information, or a size of a parking lot;
   an edge characteristic of the at least one edge includes a relationship strength vector, wherein the relationship strength vector reflects a relationship strength between two nodes, and the relationship strength vector is determined from a plurality of vectors, wherein the plurality of vectors include distance strength vectors, location strength vectors, and category strength vectors;
   the node characteristic includes surrounding traffic flow;
   an output of the graph neural network model is an area location that the population flow load is greater than the first threshold, and the area location is determined based on the correlation of each node in the graph composed of nodes and edges;
   determining, based on the area location, prompt information; and
   feedbacking the prompt information to a user terminal of the user platform through a service platform via network.

9. A non-transitory computer readable medium on which a computer program is stored, wherein the computer program, when executed by a processor, implements a method for managing a public place in a smart city, the method comprising:
   obtaining pedestrian distribution information in a preset area during a current time period via network from a storage device, including:
   a processor of a sensor network sub-platform processing a plurality of videos based on a recognition model;
   obtaining population flow information of a plurality of preset areas in the plurality of videos,
   wherein the recognition model includes a Yolo model that recognizes users in the plurality of videos and the recognition model is obtained through a training process, comprising:
      generating a plurality of first training samples and first labels; wherein the first training samples include sample videos obtained based on historical surveillance videos, the first labels include a sample object from the users and a category corresponding to an object box;
      inputting the first training samples with labels into an initial recognition model;
      updating parameters of the initial recognition model through training; and
      obtaining the recognition model when the initial recognition model satisfies a preset condition;
   obtaining pedestrian distribution information in the preset area during a current time period based on the population flow information; and
   receiving the pedestrian distribution information transmitted from the sensor network sub-platform;
   generating, based on the pedestrian distribution information, at least one area location in the preset area for a future time period, a population flow load of the area location being greater than a first threshold, wherein the at least one area location is determined by processing the pedestrian distribution information through an area location prediction model, the area location prediction model includes a graph neural network model, and the area location prediction model is trained by the public place management platform according to a machine learning algorithm based on at least one training sample and at least one label, wherein each training sample includes sample pedestrian distribution information, and each label is a sample area location that is determined by an actual population flow load of the preset area in the sample pedestrian distribution information, wherein generating the sample area location includes:

designating, by the processor of the public place management platform, a corresponding area location that the actual population flow load of the preset area in the sample pedestrian distribution information is greater than the first threshold as the sample area location;

a graph input into the graph neural network model includes at least two nodes and at least one edge, each of the at least two nodes includes at least one public place site, and the at least one edge includes a relationship between the at least two nodes;

a node characteristic of each node includes a count of entrances and exits of the at least one public place site, distribution positions of the entrances and the exits, time information, node environment information, holiday information, or a size of a parking lot;

an edge characteristic of the at least one edge includes a relationship strength vector, wherein the relationship strength vector reflects a relationship strength between two nodes, and the relationship strength vector is determined from a plurality of vectors, wherein the plurality of vectors include distance strength vectors, location strength vectors, and category strength vectors;

the node characteristic includes surrounding traffic flow;

an output of the graph neural network model is the area location, and the area location is determined based on a correlation of each node in the graph composed of nodes and edges;

generating, based on the area location, prompt information; and feedbacking the prompt information to a user terminal of a user platform through a service platform via network.

* * * * *